Oct. 15, 1968  C. N. GOSNELL ET AL  3,405,886
METHOD OF MAKING INFLATIONABLE ERECTABLE HOLLOW STRUCTURES
Filed May 23, 1962

WITNESSES

INVENTORS
Charles N. Gosnell &
Stanley H. Saulson
BY
AGENT

United States Patent Office 3,405,886
Patented Oct. 15, 1968

3,405,886
METHOD OF MAKING INFLATIONABLE ERECTABLE HOLLOW STRUCTURES
Charles N. Gosnell and Stanley H. Saulson, Baltimore, Md., assignors to Westinghouse Electric Corporation, East Pittsburgh, Pa., a corporation of Pennsylvania
Filed May 23, 1962, Ser. No. 197,113
2 Claims. (Cl. 244—1)

ABSTRACT OF THE DISCLOSURE

In a method of making an inflation-erectable and rigidizable structure, the steps of cutting and joining its wall sections from a flexible material containing a plastic which is maintained flexible by inclusion of a permanent type plasticizer; substituting, by leaching, a volatile plasticizer for the permanent plasticizer in the joined wall sections to maintain flexibility of the plastic therein on a short-term basis permissive of erection by inflation and rigidizing in its erected configuration by evaporation of such volatile plasticizer; and storing the volatile-plasticizer-containing assemblage in a sealed container pending removal for inflation erection.

---

It has been proposed heretofore to provide hollow rigidized structures such as may include a parabolic antenna reflector, tubular rim for peripheral reflector support, column struts for locating a horn radiator, etc. which may be erected by internal pressurization. Such structures are particularly suited for erection in outer space to which they may be transported in a collapsed compact state, inflated, and made rigid without subsequent dependence upon internal pressure. Such inflation-erection and rigidity without dependence upon internal pressure has certain advantages and may be obtained by storage in a sealed canister, transported to the erection site, released, erected by inflation, and rigidized by evaporation of a plasticizer from a plastic-coated fabric of which the walls of the structure may be composed, as set forth for example in a paper entitled "Consideration for Inflatable Antennas in Space" presented to the Winter Convention in Military Electronics in Los Angeles, Calif., in 1960.

Certain problems arise in the making of these structures in preparation for storage in the sealed canister and/or inflation and rigidization. Accordingly, it is an object of the present invention to provide a practical method of such making.

In accord with the general feature of the invention, this result is obtained by employment of a flexible plastic coating or flexible-plastic-fibre fabric having a permanent plasticizer included therein which affords opportunity to cut and shape the wall material, secure what seams may be involved, and in general to work the flexible material conveniently without regard to time or concern for becoming rigidized by evaporation of the plasticizer, which is prevented by the permanent nature of the latter. In this state the structure remains flexible indefinitely and may be handled and stored freely and indefinitely without particular need for a sealed container. Subsequently, prior to preparation for transport storage and/or inflation-erection and rigidization, the structure in its flexible collapsed state is subjected to or immersed in a volatile non-permanent type of plasticizer which becomes substituted for the permanent-type plasticizer in the plastic material. Following such substitution and before the later volatile plasticizer has had an opportunity to evaporate to the extent which effects the rigidization of the wall material, the structure in its still flexible form either will be folded and placed in a canister and sealed to prevent effective evaporation of such substituted volatile plasticizer, or will be inflated and the plasticizer allowed to evaporate for rigidization of the inflated structure, this latter step being one which usually will follow sealed-canister-storage, but may take place without having been so stored as in some cases where the structure may be erected on the earth's surface and it may be desired to eliminate such storage.

Other objects and advantages of the invention will become apparent from the following detailed description thereof when taken in connection with the accompanying drawings in which.

In accord with more particular features of the invention, the original material of which the wall or walls of the structure may be composed preferably includes a fabric material such as fibres of nylon, or of such as glass fibres to give such walls stretch resistance and durability. This wall material also includes the aforementioned plastic material such as flexible vinyl applied as a coating on a surface or surfaces of the material or impregnation of the fabric material. In this original state of the plastic-coated or plastic-impregnated wall material, the plastic includes a permanent-type plasticizer such as dioctyl phthalate or trioctyl phosphate, as is commonly employed in the plastic art.

Figure 2:
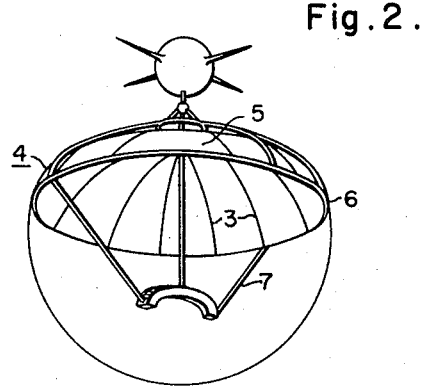
FIGS. 2 and 3 illustrate structures in exemplified inflated shapes which may be rigidized in space and on earth, respectively, by evaporation of the substitute volatile plasticizer in the plastic-containing or plastic-coated fabric wall material of the structure.

Next, suitable patterns or gores 2 are cut from the wall material containing, coated with, or composed of "permanently" flexible plastic and the patterns or gores suitably joined together at seams 3 to form a collapsed, flexible-walled structure or enclosure assemblage 4 capable of being inflated to assume a hollow structural configuration such as may include a radio frequency energy reflective surface 5 of parabolic focusing contour, tubular rim and column struts 6 and 7, etc. as employed in an inflated space antenna structure exemplified in FIG. 2. In the collapsed state of the fabricated inflatable assemblage 4 while the plastic included in the wall material remains "permanently" flexible, or in other words while capable of being readily flexed without resistance to bending or damage to the wall material, such assemblage may be handled, transported, stored, etc. without necessity for pressure-sealed storage or concern for loss of flexibility or ready capability of being inflated for erection and without significant jeopardy to pressure-retaining capability of the assemblage and its ability to assume its prescribed inflated-to shape.

Next, in accord with the present invention, prior to inflation-erection the collapsed inflatable assemblage 4 is subjected to a volatile liquid material, such as toluene, trichlor-ethylene, benzene, carbon tetrachloride, methyl chloroform, which are suitable non-permanent softening or plasticizing agents for the vinyl plastic of the wall material as exemplified. This step is preferably accomplished by immersion and causes the original permanent-type plasticizer such as dioctyl phthalate or trioctyl phosphate to be leached out of the plastic and become substituted or significantly ineffectuated by the volatile agent.

Following this, the assemblage 4 will remain flexible, or capable of being readily inflated, only for a relatively short period of time, which may be measured in minutes or hours according to the environmental conditions and to the particular substitute, volatile plasticizer agent, if such agent is allowed to evaporate from the wall material of the assemblage.

Figure 1:
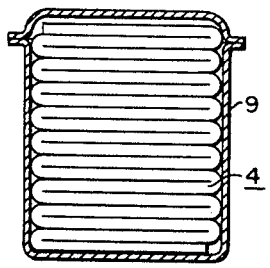
FIGURE 1 illustrates the structure while collapsed and stored in a sealed canister to prevent evaporation of the volatile plasticizer and maintain flexibility of the structure.
Figure 3:
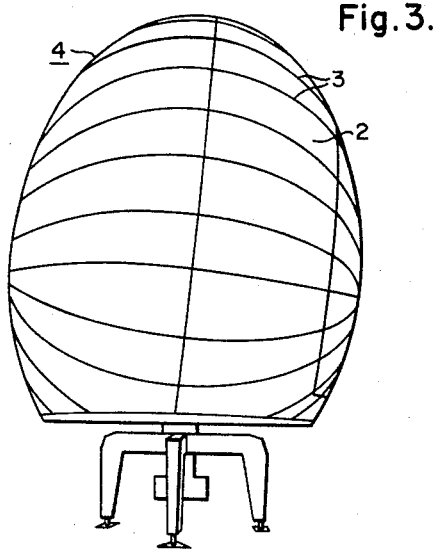

Accordingly, the collapsed assemblage 4 in folded form either must then be placed into an hermetically-sealed canister 9 as in FIG. 1, or inflated to its ultimate shape such as shown in FIG. 3, for example.

As previously discussed generally, the collapsed, inflatable, rigidization-prepared assemblage 4 may be transported while sealed-canister-contained to a site in outer space or to a site on earth. Following removal or ejection from the canister it will be inflated, either by the vapor pressure of the non-permanent volatile agent within the assemblage, as is feasible in outer space, or by independent gas pressure source as may be feasible in space and also on earth. Presence of the vapors of the substitute, volatile, non-permanent, plasticizing agent if within the enclosure assemblage 4 while being inflated will maintain flexibility, pliability or softness of the plastic in the wall material. After inflation to final configuration, these internal vapors will escape by diffusion through the wall fabric or via vapor exhaust orifices (not shown). In any event, the evaporation of the volatile non-permanent plasticizer from the wall material of the inflated structure will cause the plastic which it includes to become stiff or rigid, thereby rigidizing such wall material, and maintaining the inflated-to shape of the structure without subsequent depedence upon internal gas or vapor pressure. In the case of plasticizer-vapor-erection, rigidization of the wall material may occur progressively as the internal vapors gradually escape or are vented. In the case of independent gas erection, the inflation gas will act to accelerate and aid in the evaporation and rigidizing, particularly if permitted to flow through the structure after full inflation.

It should be pointed out that the invention is applicable in principle to use with inflatable-structure wall materials containing other than nylon or glass fibers and other than vinyl plastic; Neoprene, polyurethane, for example, in which case substitute, volatile, non-permanent plasticizers will be chosen which are suitable for performance in accord with the teachings of the present invention. It also is within the scope of the present invention to employ a coating or gas or vapor barrier of pressure sealing material in association with the walls of the structure to impart the inflation-erection capability independently of the rigidizing capability.

Wherein "permanent" plasticizer is referred to herein, it is meant a plasticizer which is capable of or intended to maintain the plastic or elastomer in a flexible condition in the earth's atmosphere for prolonged periods of time measured in months to years.

Another practical method of arriving at an inflatable, rigidizable structure would employ a semi-permanent or fugitive plasticizing agent, such as triethyl phosphate, initially in the rigidizing plastic or elastomer in lieu of a permanent type elastomer, at a sacrifice in maximum time available for fabrication prior to sealed canister storage. Such time being in the order of days or weeks in contrast to months and years for the permanent type. In use of the semi-permanent type of plasticizer initially, substitution of plasticizers is not necessary, but due to its vapor pressure characteristics or volatility, it is possible that erection by its vapor pressure alone may not be feasible and may require assistant pressurization.

Figure 4:
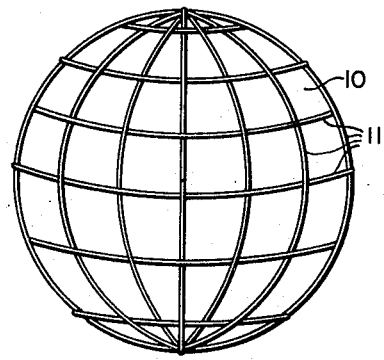
FIG. 4 illustrates an inflated structure including rigidized grids or ribs of plastic-coated, plastic-containing, or plastic-impregnated material.
Figure 5:
FIG. 5 is a fragmental view in cross section illustrating a rigidized plastic material containing filler elements for increased strength.

It should also be apparent that the concepts of this invention embrace alternate techniques for obtaining an inflation-erectable, rigidizable structure which may employ, for example, fabric which is coated or impregnated on one or both sides together with the use of rigidizable plastic or elastomer in the coating or impregnation material, and with or without a pressure retaining coating or lining according to need; a film or envelope 10 (FIG. 4) of rigidizable or non-rigidizable flexible material reinforced by grids 11 made of rigidizable plastic or elastomer-impregnated yarns or cords to ultimately form reinforcing ribs or grids or pattern to strengthen the inflation erected configuration; and/or the inclusion or fillers 12 such as particles, pellets, beads, small spheres mixed with the rigidizable plastic or elastomer to increase its strength after rigidization.

While there has been shown and described what is at present considered to be preferred embodiments of the invention, modifications thereto will readily occur to those skilled in the art. It is not desired therefore, that the invention necessarily be limited to the specific arrangements shown and described, and it is intended to cover in the appended claims all such modifications as fall within the true spirit and scope of the invention.

We therefore particularly point out and distinctly claim as our invention:

1. In a method of fabricating an inflatable structure, comprising the steps of cutting and joining the wall sections of such structure from a flexible plastic-containing material capable of being regidized, the plastic of such material including permanent type plasticizer, ineffectuating the permanent type plasticizer in the plastic of the wall material by subjecting such material to a non-permanent volatile plasticizer, and subsequently storing such structure in collapsed state in a sealed canister to prevent rigidization thereof prior to inflation.

2. In a method of constructing a rigidizable, inflation-erectable structure, comprising the steps of forming and joining structure-defining sections of flexible rigidizable material which includes a plastic containing a permanent type plasticizer during such forming and joining, and subsequently providing for rigidizing of such material by immersing the joined sections in a volatile agent to leach out the permanent type plasticizer.

References Cited
UNITED STATES PATENTS

| | | | |
|---|---|---|---|
| 3,024,941 | 3/1962 | Vandenberg | 220—63 |
| 2,703,769 | 3/1955 | Stinger et al. | 156—251 |
| 2,767,941 | 10/1956 | Gegner et al. | 156—251 |
| 2,649,101 | 8/1953 | Suits | 135—1 |
| 2,812,769 | 11/1957 | Schaefer et al. | 135—1 |
| 2,154,203 | 4/1939 | Hauffe | 260—34.2 |
| 2,138,730 | 4/1941 | Hauffe | 260—34.2 |
| 2,305,859 | 12/1942 | Freund | 260—34.2 |
| 2,814,038 | 11/1957 | Miller | 343—872 |
| 2,846,334 | 8/1958 | Fleck et al. | 117—63 |
| 3,098,229 | 6/1959 | Raabe | 343—705 |

OTHER REFERENCES

"Paraballow Antennas—New Space Tool" Missiles and Rockets, Jan. 11, 1960, pp. 21, 22, and 25 cited.

JACOB H. STEINBERG, *Primary Examiner.*